United States Patent
Yoo et al.

(10) Patent No.: US 6,917,651 B1
(45) Date of Patent: Jul. 12, 2005

(54) VARIABLE LENGTH CODING METHOD AND APPARATUS

(75) Inventors: Kook-yeol Yoo, Suwon (KR); Byung-sun Choi, Suwon (KR); Yung-lyul Lee, Seoul (KR); Jong-dae Kim, Kwacheon (KR)

(73) Assignee: Samsung Electronics Co., Ltd. (KR)

( * ) Notice: Subject to any disclaimer, the term of this patent is extended or adjusted under 35 U.S.C. 154(b) by 625 days.

(21) Appl. No.: 09/643,871

(22) Filed: Aug. 23, 2000

(30) Foreign Application Priority Data

Jan. 28, 2000 (KR) .......................................... 2000-4246

(51) Int. Cl.[7] .................................................. H04N 7/12
(52) U.S. Cl. .................................................. 375/240.24
(58) Field of Search ...................... 341/67; 375/240.23, 375/240.01–240.02, 240.12–240.15, 240.24, 240.26

(56) References Cited

U.S. PATENT DOCUMENTS

| | | | | |
|---|---|---|---|---|
| 5,528,628 A | * | 6/1996 | Park et al. .................. 375/240 |
| 5,714,950 A | * | 2/1998 | Jeong et al. ................. 341/67 |
| 5,808,572 A | * | 9/1998 | Yang et al. .................. 341/107 |
| 5,930,390 A | * | 7/1999 | Coelho ........................ 382/168 |
| 5,978,029 A | * | 11/1999 | Boice et al. ........... 375/240.14 |
| 5,999,111 A | * | 12/1999 | Park et al. ..................... 341/67 |
| 6,265,997 B1 | * | 7/2001 | Nomizu ....................... 341/107 |
| 6,339,616 B1 | * | 1/2002 | Kovalev ................ 375/240.16 |
| 6,343,153 B1 | * | 1/2002 | Kawasaki et al. .......... 382/239 |
| 2001/0002205 A1 | * | 5/2001 | Beattie .................. 375/240.12 |

* cited by examiner

Primary Examiner—Chris Kelley
Assistant Examiner—Dave Czekaj
(74) Attorney, Agent, or Firm—Sughrue Mion, PLLC (57) ABSTRACT

A variable length coding method and apparatus is provided. The variable length coding method includes the steps of (a) selecting predetermined macroblocks from among the previous macroblocks of a macroblock to be coded in a current frame, (b) analyzing the occurrence statistics of symbols with respect to the selected macroblocks, (c) resetting a mapping relationship based on the analyzed occurrence statistics of symbols, and (d) variable length coding a current macroblock based on the reset mapping relationship. The variable length coding method dynamically varies the mapping relationship between symbols and bit patterns based on the occurrence statistics of the symbols, thereby reducing the amount of bits generated when coding images of the same picture quality.

5 Claims, 9 Drawing Sheets

AVERAGE BIT RATE [BITS/FRAME]
TEST IMAGE : SILENT VOICE (QCIF, 10Hz)

FIG. 7B

AVERAGE BIT RATE [BITS/FRAME]
TEST IMAGE : NEWS (QCIF, 10Hz)

FIG. 7C

TEST IMAGE : FOREMAN (QCIF, 10Hz)

FIG. 7D

TEST IMAGE : STEFAN, (QCIF, 10Hz)

VARIABLE LENGTH CODING METHOD AND APPARATUS

BACKGROUND OF THE INVENTION

1. Field of the Invention

The present invention relates to a variable length coding method, and more particularly, to a variable length coding method for dynamically varying the mapping relationship between a symbol and bit pattern, depending on the occurrence statistics of input symbols. The present invention also relates to a variable length coding apparatus for performing the variable length coding method. The present invention also relates to a variable length decoding method of decoding a bit pattern which has been coded by the variable length coding method. The present invention also relates to a variable length decoding apparatus for performing the variable length decoding method.

2. Description of the Related Art

Figure 1:
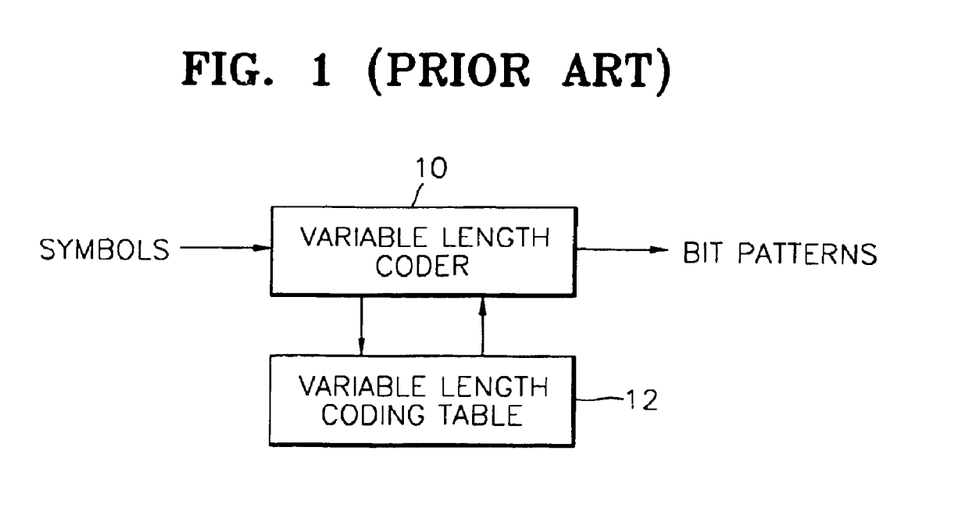
FIG. 1 is a block diagram of a conventional variable length coding apparatus.

Standardized video CODECs adopt a variable length coding (VLC) technique to obtain high coding efficiency. FIG. 1 shows a block diagram of a conventional variable length coding apparatus. Referring to FIG. 1, a variable length coder 10 receives a symbol and performs variable length coding based on a variable length coding table 12, in which each symbol is mapped onto a bit pattern of a different length based on average symbol statistics of usual test patterns.

However, the symbol statistics considerably vary depending on a video sequence and coding parameters. Accordingly, in a conventional variable length coding technology, it sometimes happens that a large number of bits is allocated to a symbol even if the symbol appears frequently. This causes a problem of decreasing the efficiency of compression of bits by variable length coding.

To solve this problem, a conventional method prepares a plurality of variable length coding tables and selects one among the prepared variable length coding tables based on the result of sorting a given video sequence according to coding parameters during coding. However, this method is disadvantageous in that it is difficult to sort a given sequence and that a bit rate cannot be efficiently reduced because the statistical characteristics of symbols vary even with the same coding parameters.

SUMMARY OF THE INVENTION

To solve the above problem, a first object of the present invention is to provide a variable length coding method capable of efficiently reducing a bit rate.

A second object of the present invention is to provide a variable length coding apparatus for performing this method.

A third object of the present invention is to provide a variable length decoding method for decoding a bit pattern which has been coded by the variable length coding method.

A fourth object of the present invention is to provide a variable length decoding apparatus for performing the variable length decoding.

To achieve the first object, in one aspect, the present invention provides a variable length coding method including the steps of (a) selecting predetermined macroblocks from among macroblocks previous to a macroblock which is to be coded in a current frame, (b) analyzing the occurrence statistics of symbols with respect to the selected macroblocks, (c) resetting a mapping relationship based on the analyzed occurrence statistics of symbols, and (d) variable length coding a current macroblock based on the reset mapping relationship.

The step (a) is preferably the step of selecting macroblocks that are generated after resynchronization, from among the previous macroblocks of the macroblock to be coded. Alternatively, the step (a) may include the step of selecting macroblocks that are in the 4-connected neighborhood or in the 8-connected neighborhood of the macroblock to be coded, from among the previous macroblocks of the macroblock to be coded.

Preferably, the step (a) includes the steps of (a-1) selecting symbols that occur a predetermined number of times or more from among symbols that are generated, and (a-2) analyzing the occurrence statistics of only the selected symbols. The step (d) includes the steps of (d-1) variable length coding the selected symbols in the current macroblock based on the reset mapping relationship and (d-2) variable length coding the unselected symbols in the current macroblock based on a default mapping relationship.

In another aspect, the present invention provides a method of variable length coding input image symbols, Including the steps of (a) analyzing the occurrence statistics of the input symbols with respect to a frame previous to a current frame, (b) resetting a mapping relationship based on the analyzed statistics, (c) replacing the input symbols with mapped symbols based on the reset mapping relationship, (d) constructing a current macroblock in the current frame using the mapped symbols, (e) selecting predetermined macroblocks from among the previous macroblocks of the current macroblock, (f) analyzing the occurrence statistics of symbols with respect to the selected macroblocks, (g) resetting mapping relationship based on the analyzed occurrence statistics of symbols, and (h) variable length coding a current macroblock based on the reset mapping relationship.

Preferably, the step (a) includes the step of calculating the occurrence probability $P_i$ of an i-th symbol $a_i$ in N of symbols using W $$P_i = \frac{\sum_{t=n-1}^{n-W} }{\sum_{j=0}^{N-1} \sum_{t=n}^{n-W}}$$

of previous frames in accordance with where i is a predetermined positive number indicating a symbol number, $c_i(t)$ is the number of occurrences of the symbol $a_i$ in a t-th frame, and W is a predetermined positive integer indicating the number of frames used for the calculation of the symbol probability.

The step (a) may include the step of analyzing the occurrence statistics of symbols using only symbols that are obtained from a frame immediately before the current frame, or the step of analyzing the occurrence statistics of symbols using symbols that are obtained from all the previous frames of the current frame.

Preferably, the step (b) includes the steps of reordering the symbols $a_i$ based on the occurrence statistics $P_i$ of the symbols $a_i$ such that $P_{i'} \geq P_{i'+1}$ if $\leq i'+1$, where i' is a new number of a symbol $a_i$, and generating a mapping table in which m(i)=i' based on the reordered relationship.

Before the step (c), the method preferably further includes the step of (cd-1) detecting whether the scene of each of the previous frames is similar to the scene of the current frame. The current frame is variable length coded using a default variable length coding table and the mapping relationship when it is determined that the scene of a previous frame is not similar to the scene of the current frame in the step (cd-1), and the step (d) is performed when it is determined that the scene of a previous frame is similar to the scene of the current frame in the step (cd-1).

The step (cd-1) preferably includes the steps of (cd-1-1) checking to find whether the ratio of occurrences of an intra macroblock in a frame immediately before the current frame is equal to or greater than a predetermined threshold, and (cd-1-2) determining that the scene is changed if the ratio of occurrences of an intra macroblock in a frame immediately before the current frame is equal to or greater than a predetermined threshold, and, if not, determining that the scene is not changed.

Furthermore, the step (cd-1) preferably includes the steps of (cd-2-1) checking to find whether the difference between the number of bits, which are generated by performing the mapping between a symbol and a bit pattern in a current image frame according to the method described above, and the number of bits, which are generated by using a default variable length coding definition, is equal to or greater than a predetermined number of bits, and (cd-2-2) determining that the scene is changed if the difference is equal to or greater than the predetermined number of bits in the step (cd-2-1) and, if not, determining that the scene is not changed.

The step (cd-1) also preferably includes the steps of (cd-3-1) measuring the sum of absolute difference (SAD) between a current image frame and a motion compensated image, and (cd-3-2) determining that the scene is changed if the SAD is equal to or greater than a predetermined value in the step (cd-3-1), and, otherwise, determining that the scene is not changed.

The step (e) preferably includes the step of selecting macroblocks that are generated after resynchronization, from among the previous macroblocks of the macroblock to be coded, the step of selecting macroblocks that are in the 4-connected neighborhood of the macroblock to be coded, from among the previous macroblocks of the macroblock to be coded, or the step of selecting macroblocks that are in the 8-connected neighborhood of the macroblock to be coded, from among the previous macroblocks of the macroblock to be coded.

The step (e) also preferably includes the steps of (e-1) selecting symbols that occur a predetermined number of times or more from among symbols that are generated, and (e-2) analyzing the occurrence statistics of only the selected symbols, and the step (h) includes the steps of (h-1) variable length coding the selected symbols in the current macroblock based on the reset mapping relationship, and (h-2) variable length coding the unselected symbols in the current macroblock based on a default mapping relationship.

To achieve the second object, in one aspect, the present invention provides a variable length coding apparatus including a macroblock selector for selecting predetermined macroblocks from among the previous macroblocks of a macroblock to be coded in a current frame, a statistical analyzer for analyzing the occurrence statistics of symbols with respect to the selected macroblocks, a symbol mapper for resetting a mapping relationship based on the analyzed occurrence statistics of symbols, and a variable length coder for variable length coding a current macroblock based on the reset mapping relationship.

In another aspect, the present invention provides a variable length coding apparatus including a frame selector for selecting at least one previous frame of a current frame, a first statistical analyzer for analyzing the occurrence statistics of the input symbols with respect to the selected previous frame, a first symbol mapper for resetting a mapping relationship based on the analyzed statistics and replacing the input symbols with mapped symbols based on the reset mapping relationship, a macroblock selector for selecting predetermined macroblocks from among the previous macroblocks of a current macroblock which is constructed using the mapped symbols in the current frame, a second statistical analyzer for analyzing the occurrence statistics of symbols with respect to the selected macroblocks, a second symbol mapper for resetting the mapping relationship based on the analyzed occurrence statistics of symbols, and a variable length coder for variable length coding a current macroblock based on the reset mapping relationship.

To achieve the third object, in one aspect, the present invention provides a method of variable length decoding input bit patterns, including the steps of (a) variable length decoding the input bit patterns using a default variable length decoding table to obtain decoded symbols, (b) selecting predetermined macroblocks from among the previous macroblocks of a current macroblock, (c) analyzing the occurrence statistics of symbols with respect to the selected macroblocks, (d) resetting a mapping relationship based on the analyzed occurrence statistics of symbols, and (e) replacing the decoded symbols with mapped symbols based on the reset mapping relationship.

In another aspect, the present invention provides a method of variable length decoding input bit patterns, including the steps of (a) variable length decoding the input bit patterns using a default variable length decoding table to obtain decoded symbols, (b) analyzing the occurrence statistics of symbols with respect to a previous frame, (c) resetting a mapping relationship based on the analyzed occurrence statistics of symbols, (d) replacing the decoded symbols with mapped symbols based on the reset mapping relationship, (e) constructing a current macroblock in a current frame using the mapped symbols, (f) selecting predetermined macroblocks from among the previous macroblocks of the current macroblock, (g) analyzing the occurrence statistics of symbols with respect to the selected macroblocks, (h) resetting the mapping relationship based on the analyzed occurrence statistics of symbols, and (i) replacing all the symbols within the current macroblock with the mapped symbols based on the reset mapping relationship.

To achieve the fourth object, in one aspect, the present invention provides an apparatus for variable length decoding input bit patterns, including a variable length decoder for variable length decoding the input bit patterns using a default variable length decoding table to obtain decoded symbols, a macroblock selector for selecting predetermined macroblocks from among the previous macroblocks of a current macroblock, a statistical analyzer for analyzing the occurrence statistics of symbols with respect to the selected macroblocks, a symbol mapper for resetting a mapping relationship based on the analyzed occurrence statistics of symbols, and a symbol replacer for replacing the decoded symbols with mapped symbols based on the reset mapping relationship.

In another aspect, the present invention provides an apparatus for variable length decoding input bit patterns, including a variable length decoder for variable length decoding the input bit patterns using a default variable length decoding table to obtain decoded symbols, a first statistical analyzer for analyzing the occurrence statistics of symbols with respect to a previous frame, a first symbol mapper for resetting a mapping relationship based on the analyzed occurrence statistics of symbols, a first symbol replacer for replacing the decoded symbols with mapped symbols based on the reset mapping relationship, a macroblock selector for selecting predetermined macroblocks from among the previous macroblocks of a current macroblock which is constructed using the mapped symbols in a current frame, a second statistical analyzer for analyzing the occurrence statistics of symbols with respect to the selected macroblocks, a second symbol mapper for resetting the mapping relationship based on the analyzed occurrence statistics of symbols, and a second symbol replacer for replacing all the symbols within the current macroblock with the mapped symbols based on the reset mapping relationship.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 2A:
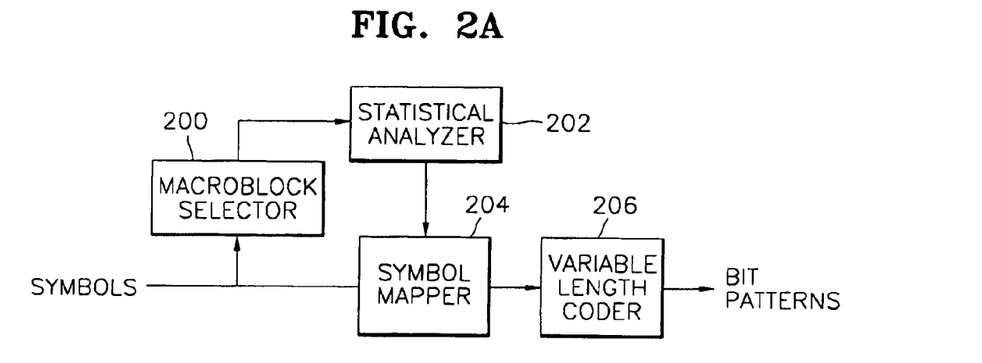
FIG. 2A is a block diagram of a variable length coding apparatus according to a first embodiment of the present invention.
Figure 2B:
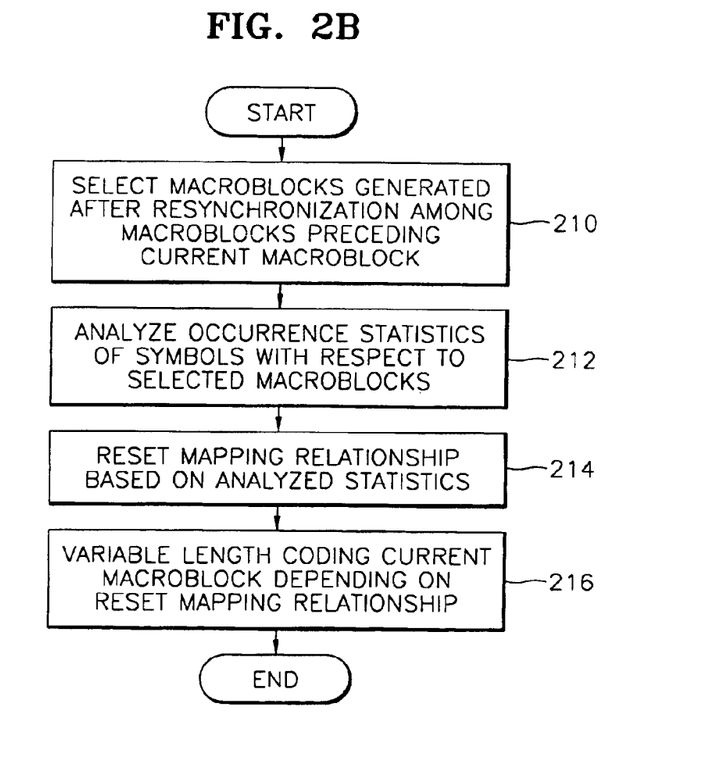
FIG. 2B is a flowchart of a variable length coding method according to the first embodiment of the present invention, which is performed in the variable length coding apparatus of FIG. 2A.

A variable length coding apparatus and method according to a first embodiment will now be described. Referring to FIGS. 2A and 2B, the variable length coding apparatus according to the first embodiment of the present invention includes a macroblock selector 200, a statistical analyzer 202, a symbol mapper 204 and a variable length coder 206.

Figure 3A:
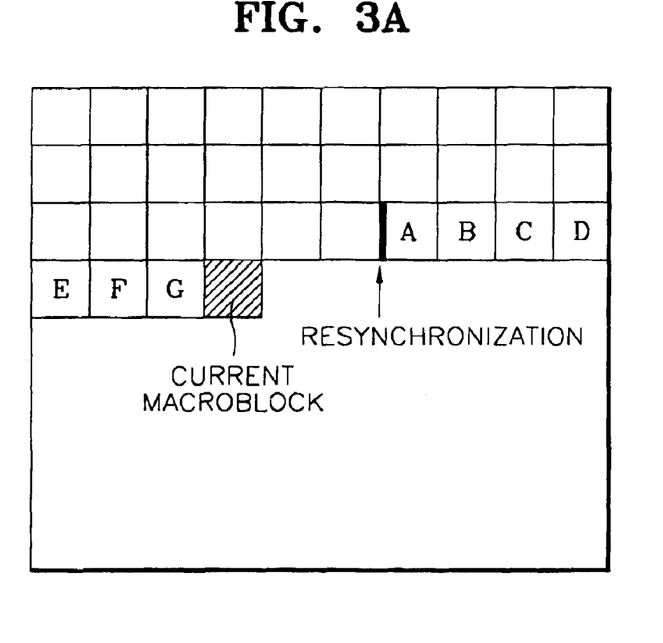
FIGS. 3A through 3C are diagrams for explaining a step of selecting macroblocks.

In the operation of this variable length coding apparatus, the macroblock selector 200 selects macroblocks, which are generated after resynchronization, among macroblocks preceding a macroblock to be currently coded in a current frame in step 210. FIG. 3A shows a step of selecting macroblocks, which are generated after resynchronization, among macroblocks preceding a macroblock to be coded in a current frame. Referring to FIG. 3A, when resynchronization occurs immediately before a macroblock A, macroblocks are randomly selected from among macroblocks A, B, C, D, E, F and G which are generated after the resynchronization.

Figure 3B:
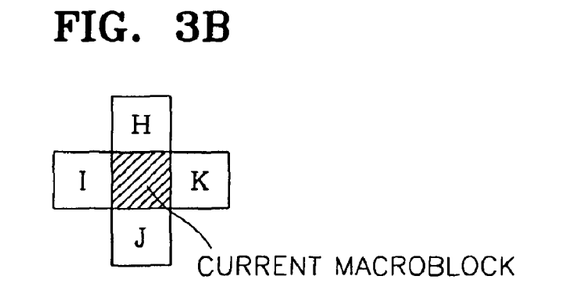

Alternatively, as shown in FIG. 3B, it is possible to select macroblocks from among the 4-connected neighborhood of a macroblock to be coded, among macroblocks preceding the macroblock to be coded. That is, among macroblocks H, I, J and K in the 4-connected neighborhood of the current macroblock, macroblocks preceding the current macroblock, i.e., macroblocks H and I, may be selected.

Figure 3C:
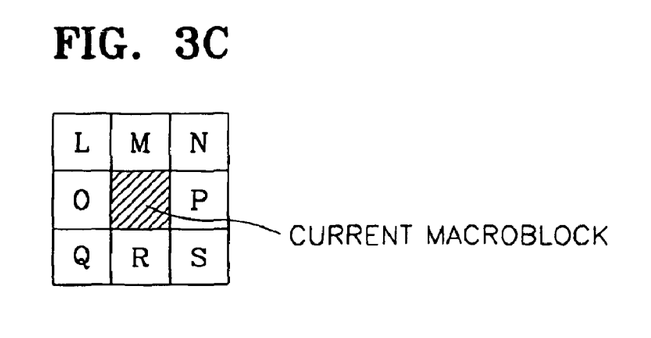

Alternatively, as show in FIG. 3C, it is possible to select macroblocks in the 8-connected neighborhood of a macroblock to be coded, among macroblocks preceding the macroblock to be coded. That is, among macroblocks L, M, N, O, P, Q. R and S in the 8-connected neighborhood of the current macroblock, macroblocks preceding the current macroblock, i.e., macroblocks L, M, N and O, may be selected.

Next, the statistical analyzer 202 analyzes the occurrence statistics of symbols for the selected macroblocks in step 212. The occurrence statistics of symbols are analyzed with respect to only the selected macroblocks. In this case, since the number of samples are small, the result of statistical analysis may be inaccurate. Accordingly, the statistical analyzer 202 more preferably selects symbols, which have been generated a predetermined number of times or more, among the symbols of the selected macroblocks and analyzes the occurrence statistics of the selected symbols. The occurrence statistics of the symbols is analyzed by measuring a ratio of the number of occurrences of an i-th symbol to the total number of all the symbols, with respect to macroblocks which are selected by $$p(i) = \frac{c_n(i)}{\sum_{j=0}^{L'-1} c_n(j)}$$

where L' is the number of symbols, which are selected in descending order starting from a symbol of a highest occurrence frequency, that have a high occurrence frequency, and $c_n(i)$ is the number of occurrences of the i-th symbol in the selected macroblocks.

Next, the symbol mapper 204 resets a mapping relationship based on the analyzed occurrence statistics of the symbols in step 214. In other words, the mapping relationship is reset so as to satisfy the following relationship.

$$b(m(i)) \geq b(m(j)) \text{ if } p(i) \leq p(j), \text{ for } i,j \in [0,L'-1] \tag{2}$$

where i and j are numerals between 0 and L'-1, and b(i) is the number of bits of a bit pattern which is mapped to the i-th symbol. When i and j are not between 0 and L'-1, the mapping relationship is maintained at a default mapping relationship.

Then, the variable length coder 206 performs variable length coding on the current macroblock depending on the reset mapping relationship in step 216. That is, the symbols of the current macroblock are coded using bit patterns corresponding to the mapped symbols. The variable length coder 206 also performs variable length coding on the current macroblock depending on the reset mapping relationship for the selected symbols, and performs variable length coding on the current macroblock depending on the default mapping relationship for the unselected symbols.

Figure 4A:
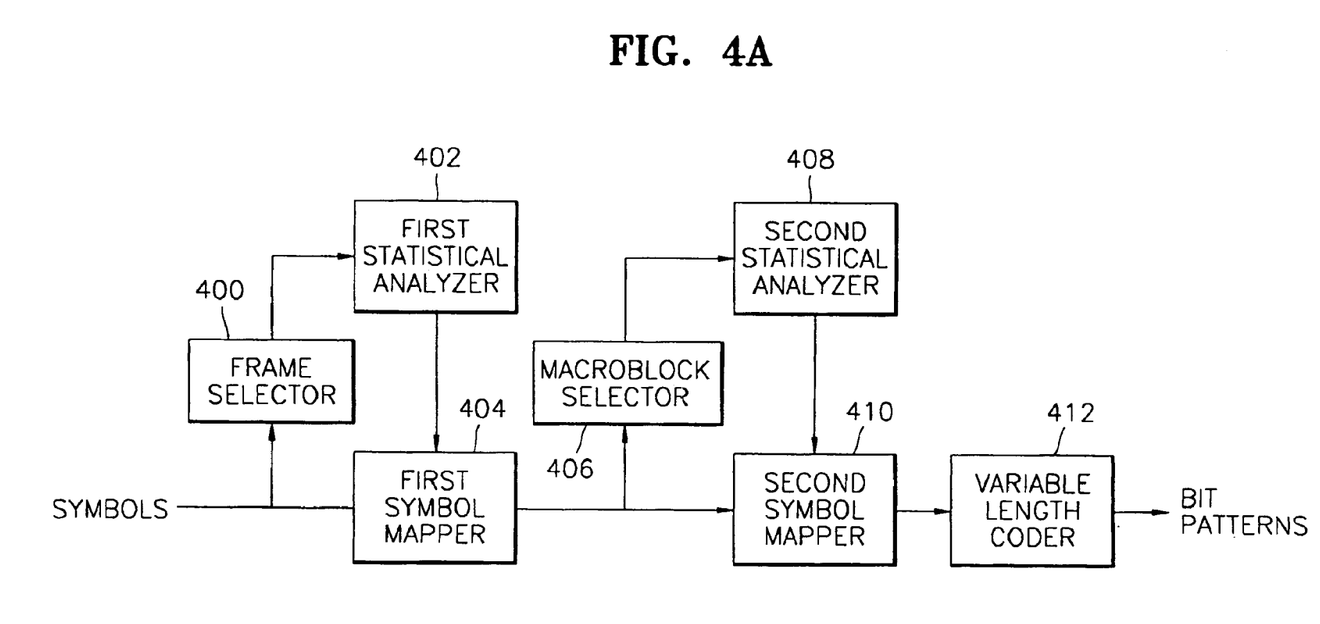
FIG. 4A is a block diagram of a variable length coding apparatus according to a second embodiment of the present invention.
Figure 4B:
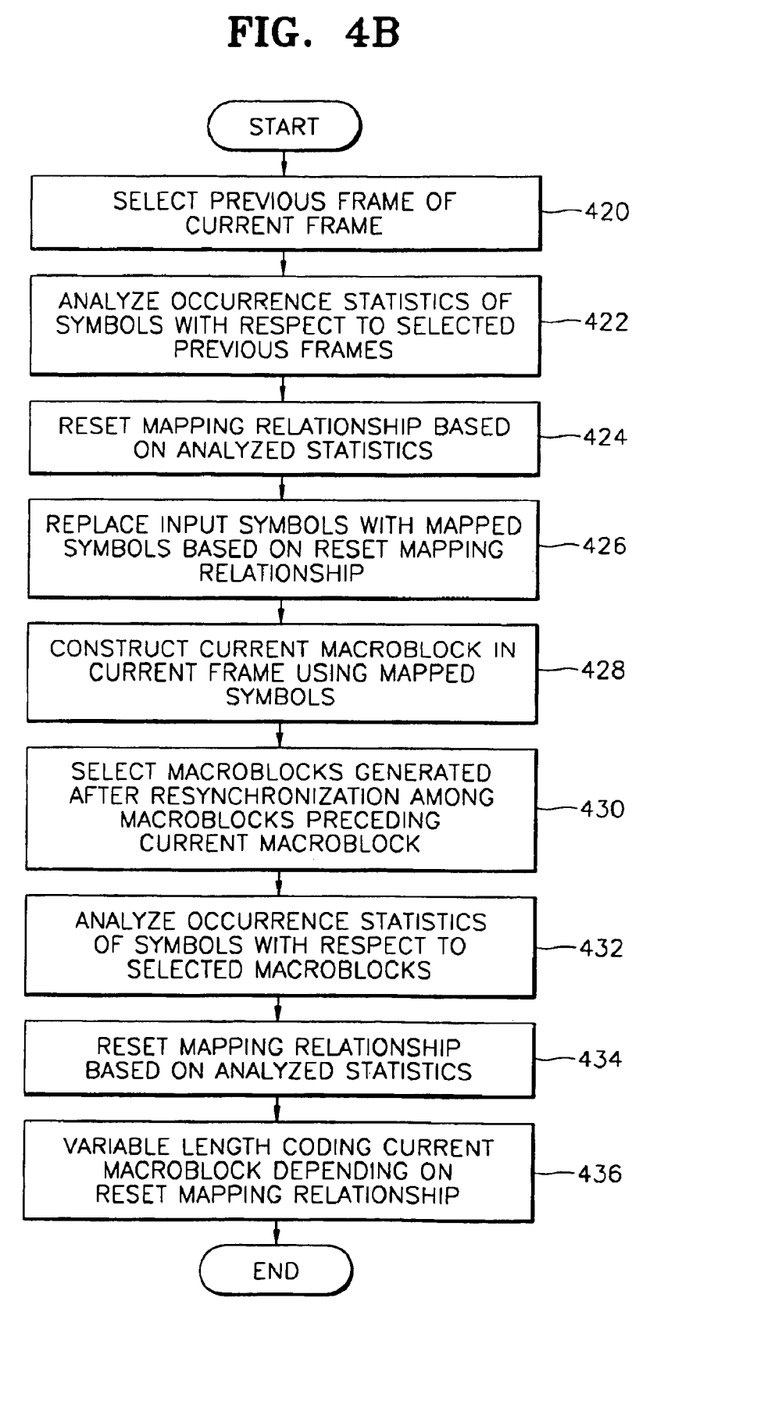
FIG. 4B is a flowchart of a variable length coding method according to the second embodiment of the present invention, which is performed in the variable length coding apparatus of FIG. 4A.

FIG. 4A is a block diagram of a variable length coding apparatus according to a second embodiment of the present invention. FIG. 4B is a flowchart of a variable length coding method according to the second embodiment of the present invention, which is performed in the variable length coding apparatus of FIG. 4A. FIG. 4B will be referred to when necessary. Referring to FIG. 4A, the variable length coding apparatus according to the second embodiment of the present invention includes a frame selector 400, a first statistical analyzer 402, a first symbol mapper 404, a macroblock selector 406, a second statistical analyzer 408, a second symbol mapper and a variable length coder 412.

The frame selector 400 selects at least one previous frame of a current frame in step 420. The predetermined number of previous frames is assumed to be a predetermined positive number W.

Next, the first statistical analyzer 402 analyzes the occurrence statistics of input symbols with respect to the selected W of previous frames in step 422. More specifically, when representing the serial number of each symbol by i, a predetermined positive number, and the number of occurrences of a symbol $a_i$ in a t-th frame by $c_t(i)$, the occurrence statistics p(i) of each symbol $a_i$ are obtained by the following Equation using the W of previous frames.

$$p(i) = \frac{\sum_{t=n-1}^{n-W} c_t(i)}{\sum_{j=0}^{L'-1} \sum_{t=n-1}^{n-W} c_t(j)} \quad (3)$$

Here, L' is the number of symbols that occur a predetermined reference number of times or more, and is smaller than L, when L is the total number of symbols of a selected frame. This embodiment of the present invention analyzes the occurrence statistics of only the symbols occurring the predetermined reference number of times or more, thereby reducing the amount of calculation. Consequently, the occurrence probability p(i) of an i-th symbol in the W of previous frames is obtained with respect to the L' kind of symbols. This embodiment of the present invention describes the analysis of occurrence statistics of each symbol using a plurality of previous frames as an example, but the present invention is not restricted to this embodiment. When necessary, the occurrence statistics of each symbol may be measured using only symbols obtained from an image immediately before a current image. Alterative, the occurrence statistics of each symbol may be measured using symbols obtained from every previous image.

Thereafter, the first symbol mapper 404 resets the mapping relationship based on the analyzed statistics in step 424 and replaces the input symbols with mapped symbols based on the reset mapping relationship in step 426. More specifically, when assuming that i and j are numerals between 0 and L'-1 and that b(i) is the number of bits of a bit pattern which is mapped to the i-th symbol, the mapping relationship is reset so as to satisfy the following relationship.

$$b(m(i)) \geq b(m(j)) \text{ if } p(i) \leq p(j), \text{ for } i,j \in [0,L'-1] \quad (4)$$

When i and j are not between 0 and L(-1, the mapping relationship is maintained at a default mapping relationship, $$m(i)=i, \quad (5)$$

Next, a current macroblock in the current frame is constructed using the mapped symbols in step 428.

Thereafter, the macroblock selector 406 selects macroblocks, which are generated after resynchronization, among macroblocks preceding the current macroblock, which is constructed using the mapped symbols in the current frame, in step 430. Alternatively, it is possible to select macroblocks in the 4-connected neighborhood or 8-connected neighborhood of a macroblock to be coded, among macroblocks preceding the current macroblock to be coded.

Next, the second statistical analyzer 408 analyzes the occurrence statistics of the symbols for the selected macroblocks in step 432. That is, when assuming that $c_n'(i)$ is the number of occurrences of the i-th symbol in the selected macroblocks and that m(i) is a symbol which is mapped in the step 426, the occurrence statistics p(i) of the i-th symbol is calculated by Equation 6.

$$p(i) = \frac{c_n'(m(i))}{\sum_{j=0}^{L'-1} c_n'(m(j))} \quad (6)$$

Not global information, but local information is used when the occurrence statistics are analyzed in the step 432. Since an inaccurate result may be obtained when statistics are analyzed using local information based on a small number of samples, it is not preferable to adopt the statistics for all the symbols. It is preferable to analyze occurrence statistics with respect to symbols which occur a predetermined number of times or more.

Next, the second symbol mapper 410 resets the mapping relationship based on the occurrence statistics of the symbols, which are analyzed in the step 432, in step 434. In other words, the mapping relationship is reset such that a bit pattern of a small number of bits is used for a symbol which occurs many times.

Then, the variable length coder 412 performs variable length coding on the current macroblock depending on the reset mapping relationship in step 436. That is, the symbols of the current macroblock are coded using bit patterns corresponding to the mapped symbols. The variable length coder 412 also performs variable length coding on the current macroblock depending on the reset mapping relationship for the selected symbols, and performs variable length coding on the current macroblock depending on the default mapping relationship for the unselected symbols.

Meanwhile, when there is no correlation between previous frames and a current frame, it is not preferable to adopt the occurrence statistics with respect to previous image frames for the current image frame. Accordingly, it is necessary to detect whether the previous image frames are similar to the current image frame. A variable length coder according to an embodiment of the present invention includes a scene change detector (not shown) to compare the scene of a previous frame with the scene of a current frame and detects whether they are similar to each other. When they are similar, the scene change detector outputs a "low" level control signal. When they are not similar, the scene change detector outputs a "high" level control signal.

During the detection of scene change, it is preferable to determine that a scene is changed when the ratio of occurrences of an intra macroblock in the previous image frame is equal to or more than a predetermined threshold. Also, it is more preferable to send scene change information which indicates whether a scene change happened to a decoder. Alternatively, it is possible to determine that a scene is changed when the difference between the number of bits, which are generated by performing the mapping between a symbol and a bit pattern in a current image frame according to the method described above, and the number of bits, which are generated by using a default variable length coding definition, is equal to or more than a predetermined number of bits. Alternatively, it is possible to determine that a scene is changed when the sum of absolute difference (SAD) between a current image frame and a motion compensated image is equal to or more than a predetermined value.

Now, when a "low" level control signal is input from the scene change detector, this indicates that a scene has not changed, and thus the first symbol mapper 404 does not reset the mapping relationship between symbols and bit patterns. On the other hand, when a "high" level control signal is input from the scene change detector, this indicates that a scene has changed, and thus the first symbol mapper 404 outputs symbols which are mapped based on the reset mapping relationship.

For a clearer understanding of the present invention, the operation of apparatuses according to embodiments of the present invention will be described with a simple example. First, it is assumed that variable length coding is performed using a variable length coding table such as Table 1.

TABLE 1

| Symbols | Bit patterns | Number of bits |
|---------|--------------|----------------|
| $a_0$ | 1 | 1 |
| $a_1$ | 01 | 2 |
| $a_2$ | 001 | 3 |
| $a_3$ | 0001 | 4 |

In addition, it is assumed that the occurrence statistics of symbols obtained after coding an arbitrary image frame are as follows.

TABLE 2

| Symbols | Occurrence statistics |
|---------|----------------------|
| $a_0$ | 0.2 |
| $a_1$ | 0.3 |
| $a_2$ | 0.1 |
| $a_3$ | 0.4 |

According to a variable length coding method of the present invention, the mapping table between symbols and bit patterns is generated depending on probabilities.

TABLE 3

| Symbol ($a_i$) | Bit pattern | Mapping table i' | $m(i) = i'$ |
|----------------|-------------|------------------|-------------|
| $a_3$ | 1 | 0 | $m(3) = 0$ |
| $a_1$ | 01 | 1 | $m(1) = 1$ |
| $a_0$ | 001 | 2 | $m(0) = 2$ |
| $a_2$ | 0001 | 3 | $m(2) = 3$ |

For example, a symbol $a_2$, which occurs least frequently, is mapped to a bit pattern of four bits, i.e., 0001. A symbol $a_3$, which occurs most frequently, is mapped to a bit pattern of a single bit, i.e., 1.

An average bit rate per symbol, which is variable length coded based on the mapping table shown in Table 3, is $\Sigma P_i S_i = 0.2 \times 1 + 0.3 \times 2 + 0.1 \times 3 + 0.4 \times 4 = 2.7$ bits/symbol. On the other hand, an average bit rate per symbol, which is variable length coded according to the present invention, is $\Sigma P_i S_{m(i)} = 0.2 \times 3 + 0.3 \times 2 + 0.1 \times 4 + 0.4 \times 1 = 2.0$ bits/symbol. Accordingly, the present invention reduces the number of generated bits by 0.7 bits/symbol.

In other words, the present invention reduces the amount of generated bits even while using a variable length coding table which is used in variable length coding. In addition, according to a variable length coding method of the present invention, variable length coding is stably performed regardless of changes in the statistical characteristics or coding parameters of an image, since the variable length coding is performed considering the statistical characteristics of symbols of an image frame.

Figure 5:
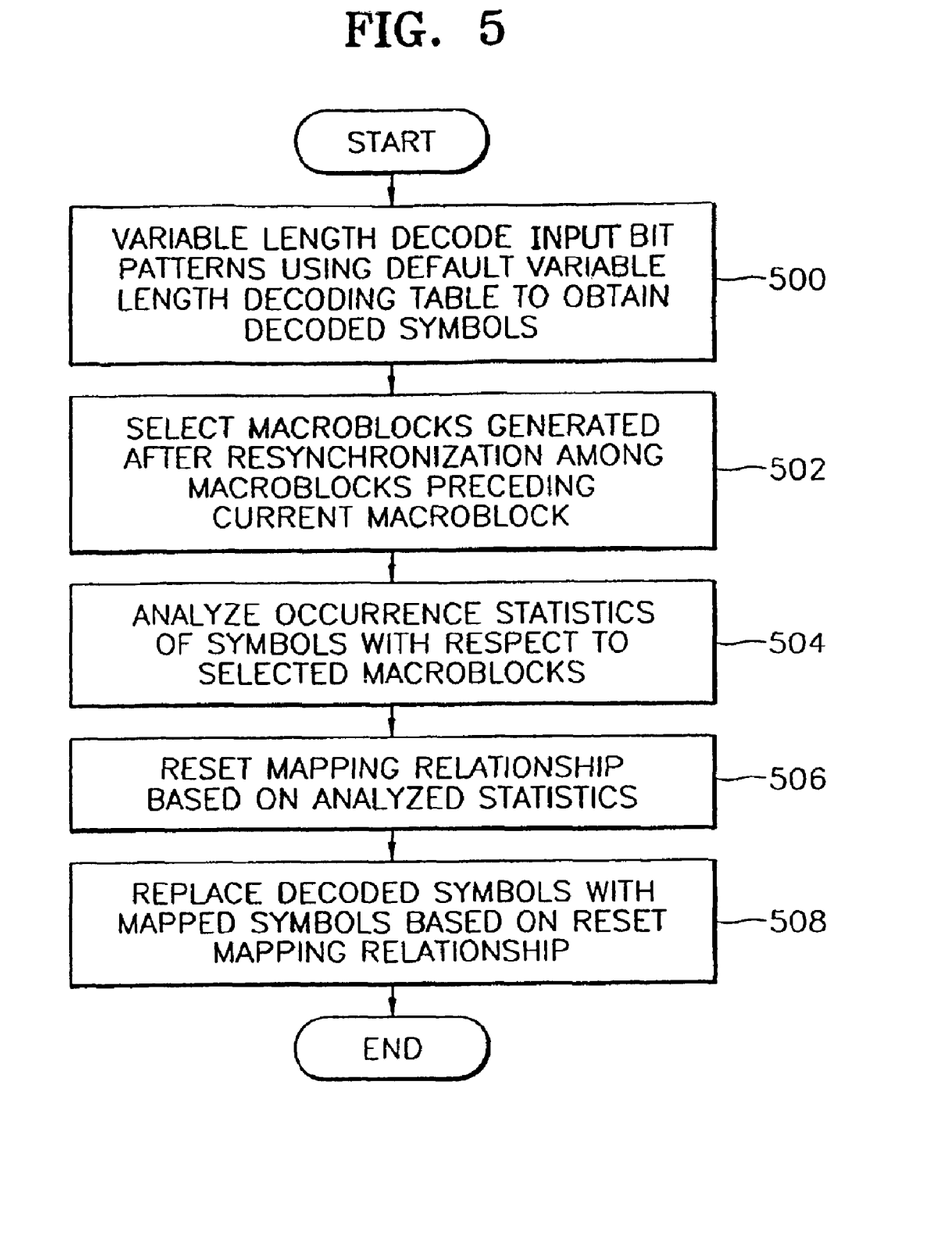
FIG. 5 is a flowchart of a variable length decoding method according to the first embodiment of the present invention.

Bit patterns that have been coded by a variable length coding method according to the present invention can be decoded by a variable length decoding method according to the present invention. FIG. 5 is a flowchart of a variable length decoding method according to the first embodiment of the present invention. The variable length decoding method shown in FIG. 5 corresponds to a method of decoding bit patterns which have been coded by the variable length coding method described with reference to FIGS. 2A and 2B. Referring to FIG. 5, first, input bit patterns are variable length decoded using a default variable length decoding table to obtain decoded symbols in step 500. Next, macroblocks that are generated after resynchronization are selected from among macroblocks preceding a current macroblock in step 502. Thereafter, the occurrence statistics of the symbols are analyzed with respect to the selected macroblocks in step 504. Following this, the mapping relationship is reset based on the analyzed statistics in step 506. In other words, symbols which frequently occur are mapped to bit patterns of a small number of bits, and symbols which do not frequently occur are mapped to bit patterns of a large number of bits. Next, symbols corresponding to the mapped bit patterns are reset as mapped symbols in a default variable length decoding table. Now, the decoded symbols are replaced with the mapped symbols based on the reset mapping relationship in step 508. Also, it is more preferable to send scene change information which indicates whether a scene change happened to a decoder.

In the above variable length decoding method, the occurrence statistics of symbols corresponding to coded bit patterns are analyzed, and the mapping relationship between symbols and bit patterns are reset based on the analyzed statistics. This reset mapping relationship is the same as that in the variable length coding method of the present invention. Therefore, the variable length decoding method according to the first embodiment of the present invention can decode bit patterns which have been coded by the variable length coding method of the present invention described with reference to FIG. 2B.

Figure 6:
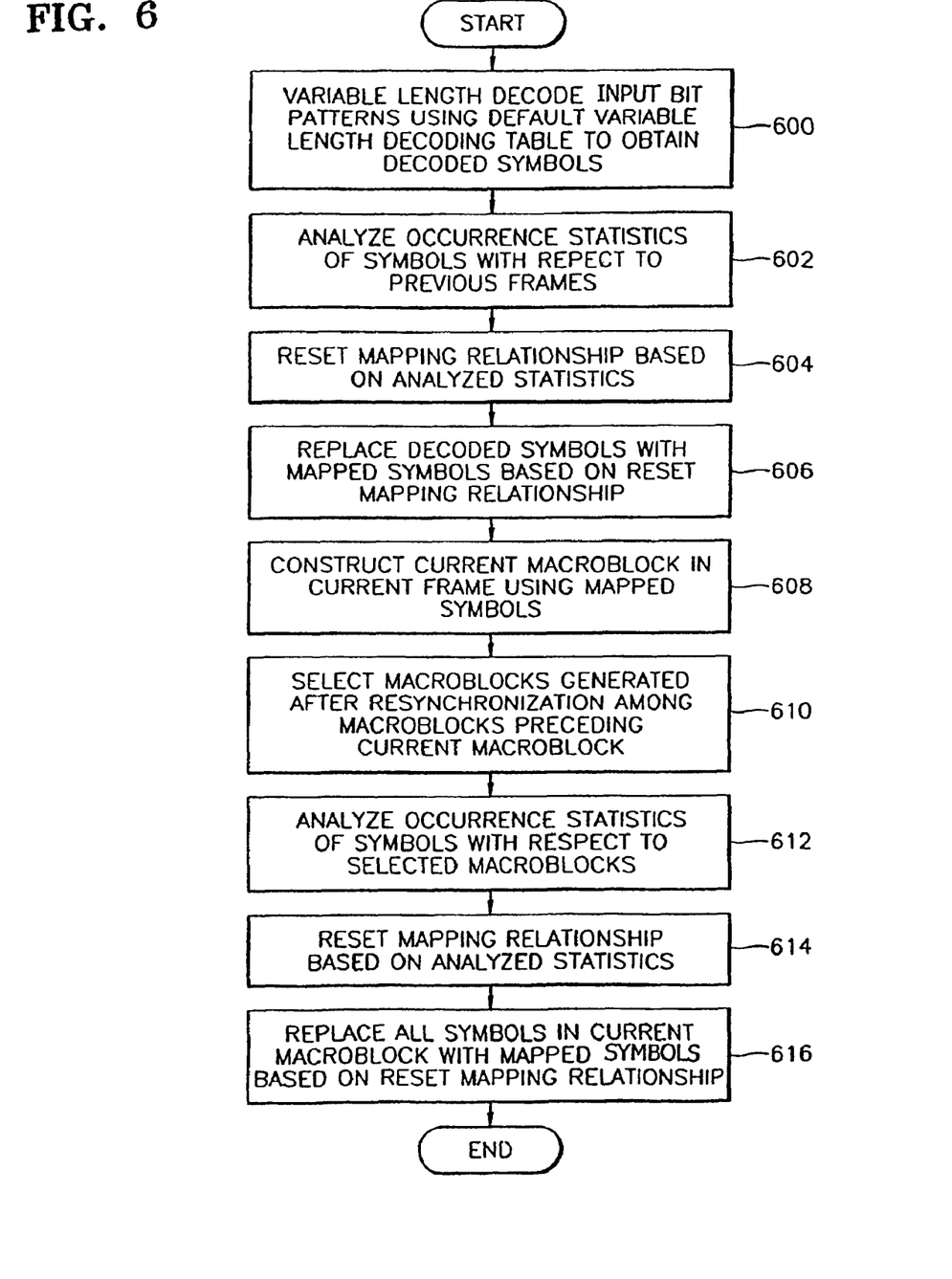
FIG. 6 is a flowchart of a variable length decoding method according to the second embodiment of the present invention.
Figure 7A:
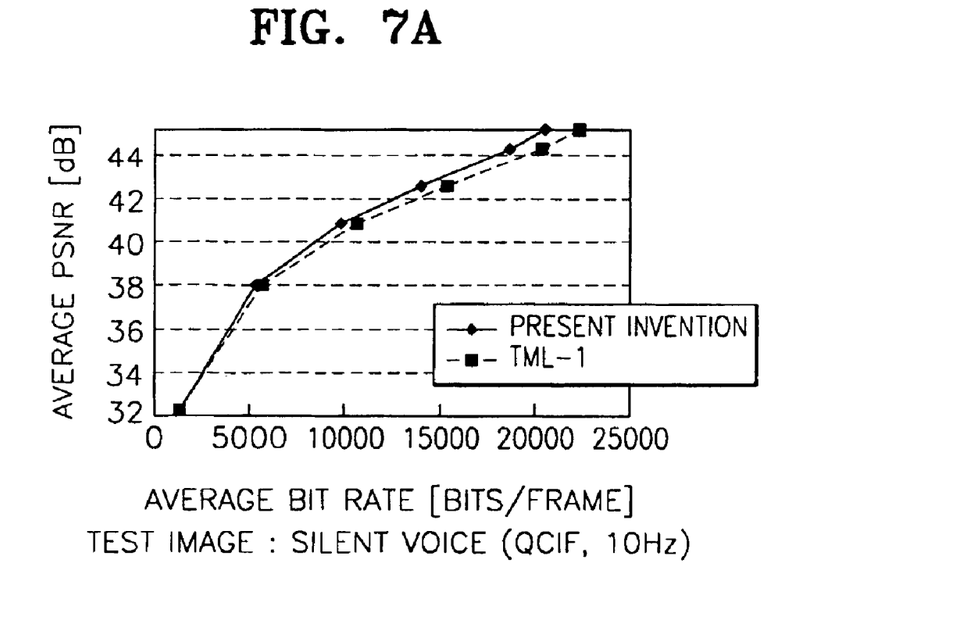
FIGS. 7A through 7D are graphs illustrating average peak signal-to-noise ratio (PSNR) with respect to average bit rate for explaining the performance difference between a variable length coding method of the present invention and a conventional variable length coding method.
Figure 7B:
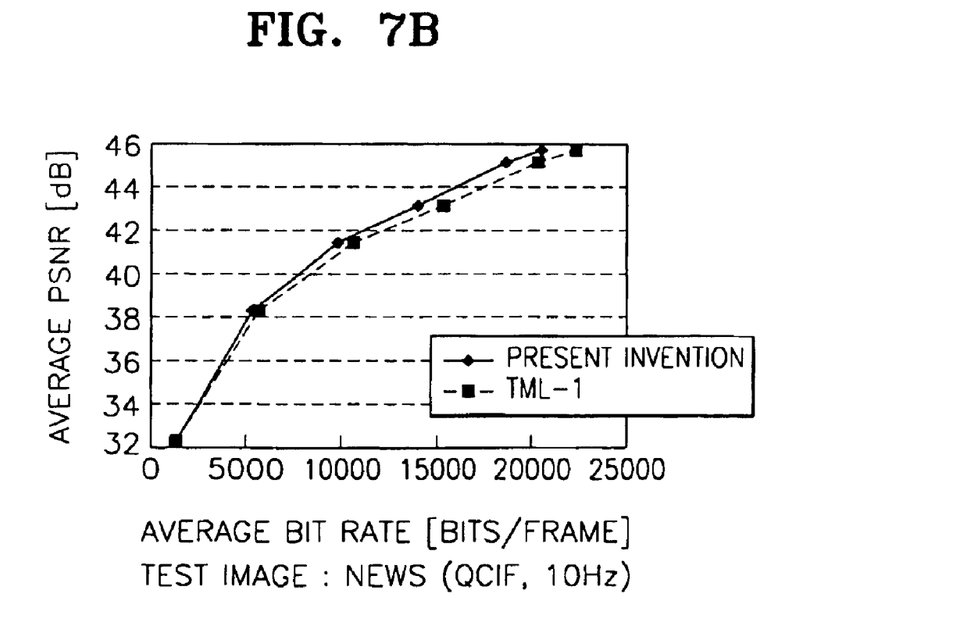
Figure 7C:
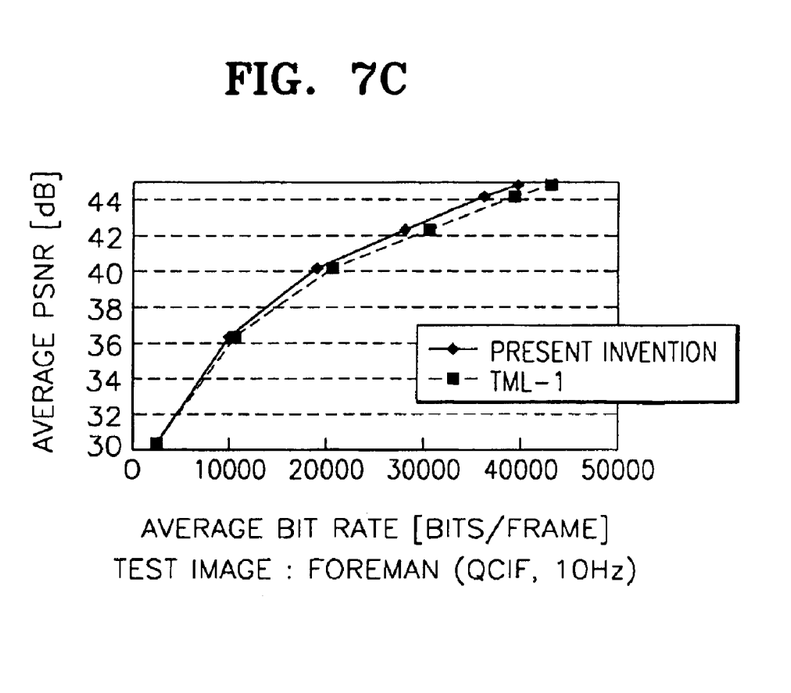
Figure 7D:
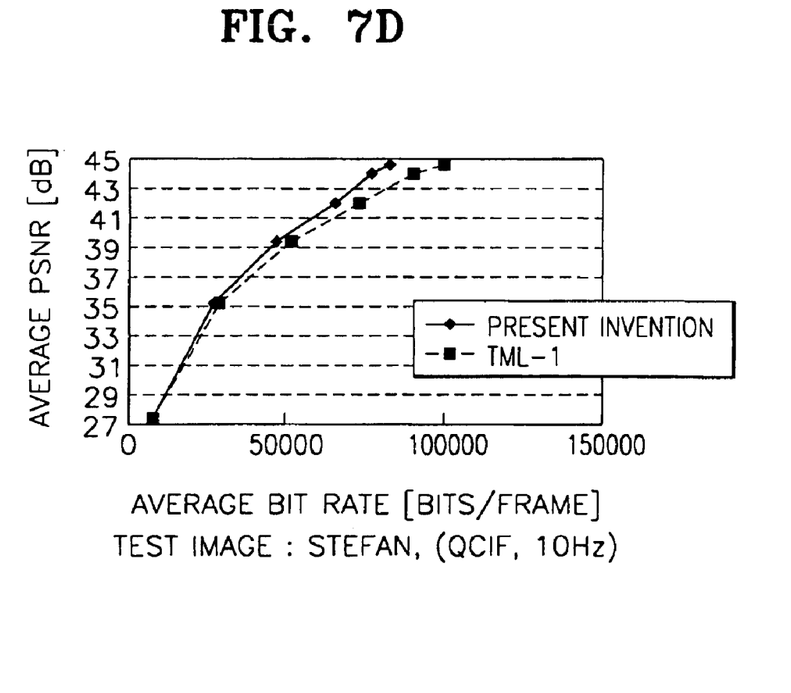

FIG. 6 is a flowchart of a variable length decoding method according to the second embodiment of the present invention. The variable length decoding method of FIG. 6 corresponds to a method of decoding bit patterns which have been coded by the variable length coding method described with reference to FIGS. 4A and 4B. Referring to FIG. 6, first, input bit patterns are variable length decoded sing a default variable length decoding table to obtain decoded symbols in step 600. Next, the occurrence statistics of symbols are analyzed with respect to previous frames in step 602, and the mapping relationship is reset based on the analyzed statistics in step 604. Next, the decoded symbols are replaced with mapped symbols based on the reset mapping relationship in step 606. Following this, a current macroblock in a current frame is constructed using the mapped symbols in step 608. Thereafter, macroblocks, which are generated after resynchronization, are selected from among the previous macroblocks of the current macroblock in step 610. Next, the occurrence statistics of symbols are analyzed with respect to the selected macroblocks in step 612. Then, the mapping relationship is reset based on the analyzed statistics in step 614, and all the symbols in the current macroblock are replaced with the mapped symbols based on the reset mapping relationship in step 616.

In the above variable length decoding method, the occurrence statistics of symbols corresponding to coded bit patterns are analyzed, and the mapping relationship between symbols and bit patterns are reset based on the analyzed statistics. This reset mapping relationship is the same as that in the variable length coding method of the present invention. Therefore, the variable length decoding method according to the second embodiment of the present invention can decode bit patterns which have been coded by the variable length coding method of the present invention described with reference to FIG. 4B.

In the variable length decoding method according to the second embodiment of the present invention, the mapping relationship between symbols and bit patterns is reset two times using the analysis of statistics with respect to previous frames and the analysis of statistics with respect to previous macroblocks in a current frame, so that both global information and local information can be considered.

A variable length decoding method according to the present invention can be performed by an apparatus. The structure of the variable length decoding apparatus is very similar to that of a variable length coding apparatus for performing a variable length coding method, and thus drawings thereof are not shown.

A variable length decoding apparatus (not shown) according to the first embodiment of the present invention includes a variable length decoder, a macroblock selector, a statistical analyzer, a symbol mapper and a symbol replacer.

In the operation of the variable length decoding apparatus, the variable length decoder variable length decodes input bit patterns using a default variable length decoding table to obtain decoded symbols. The decoded symbols construct a current macroblock in a current frame.

The macroblock selector selects predetermined macroblocks among the previous macroblocks of the current macroblock. Current macroblocks are constructed using mapped symbols. More specifically, a next macroblock in a current operation becomes the current macroblock in the next operation, and the current macroblock in the current operation becomes the previous macroblock in the next operation. In this way, when a predetermined number or more of macroblocks are constructed, predetermined macroblocks are selected from among the previous macroblocks. The macroblocks are selected based on the selection method that was used during coding of the input bit patterns.

The statistical analyzer analyzes the occurrence statistics of symbols with respect to the selected macroblocks. The occurrence statistics of symbols are not varied with coding if errors are not large. Accordingly, the occurrence statistics of symbols with respect to the selected macroblocks are the same as those obtained during the coding.

Next, the symbol mapper resets the mapping relationship based on the analyzed occurrence statistics of symbols. Since the mapping relationship is determined depending on the occurrence statistics of symbols, it is the same as that used during the coding.

The symbol replacer replaces the decoded symbols with mapped symbols based on the reset mapping relationship. With such operation, bit patterns coded by a variable length coding method according to the present invention can be successfully decoded.

A variable length decoding apparatus (not shown) according to the second embodiment of the present invention includes a variable length decoder, a first statistical analyzer, a first symbol mapper, a first symbol replacer, a macroblock selector, a second statistical analyzer, a second symbol mapper and a second symbol replacer.

In the operation of the variable length decoding apparatus, the variable length decoder variable length decodes input bit patterns using a default variable length decoding table to obtain decoded symbols.

The first statistical analyzer analyzes the occurrence statistics of symbols with respect to previous frames. The previous frame or frames may be a single image frame immediately before a current frame or a predetermined number of previous frames.

The first symbol mapper resets the mapping relationship based on the analyzed occurrence statistics of symbols. The first symbol replacer replaces the decoded symbols with mapped symbols based on the reset mapping relationship. This operation is the same as that performed in the first embodiment.

Next, the macroblock selector selects predetermined macroblocks among the previous macroblocks of the current macroblock. Current macroblocks are constructed using mapped symbols. More specifically, a next macroblock in a current operation becomes the current macroblock in the next operation, and the current macroblock in the current operation becomes the previous macroblock in the next operation. In this way, when a predetermined number of more of macroblocks are constructed, predetermined macroblocks are selected from among the previous macroblocks. The macroblocks are selected based on the selection method that was used during coding of the input bit patterns.

Thereafter, the second statistical analyzer analyzes the occurrence statistics of symbols with respect to the selected macroblocks. The second symbol mapper resets the mapping relationship based on the analyzed occurrence statistics of symbols. The second symbol replacer replaces all the symbols in the current macroblock with mapped symbols based on the reset mapping relationship.

Simulations were performed to show differences in performance between a variable length coding method according to the present invention and a conventional variable length coding method. FIGS. 7A through 7D are graphs illustrating the average peak signal-to-noise ratio (PSNR) with respect to the average bit rate, which were obtained from the simulations. FIGS. 7A, 7B, 7C and 7D show the results of simulations using Silent voice, News, Foreman and Stefan, respectively, which are recommended by International Electrotechnology Commission (IEC), as test images. Each of the test images has a QCIF frame format of 176×144 pixels and a temporal resolution of 10 Hz. For other test conditions, common test conditions defined in H.26L were used. Referring to FIGS. 7A through 7D, it can be seen that the average PSNR of a variable length coding method according to the present invention was larger than that of a coding method according to a H.26L test model longterm (TML)-1 standard, with respect to the same average bit rate. In addition, as the bit rate increased, the average PSNR was greatly improved in the variable length coding method according to the present invention compared to the coding method according to the H.26L TML-1 standard.

Bit rate reduction effects of a quantization step in the test images are estimated in Table 4.

TABLE 4

| Quantization step size | Silent | Foreman | News | Stefan | Mean |
| --- | --- | --- | --- | --- | --- |
| | | [%] | | | |
| 4 | 9.01 | 8.22 | 9.86 | 15.36 | 10.61 |
| 5 | 8.64 | 7.85 | 9.46 | 14.47 | 10.11 |
| 7 | 7.86 | 7.41 | 8.70 | 12.37 | 9.09 |
| 10 | 7.22 | 7.24 | 7.95 | 9.54 | 7.99 |
| 15 | 6.75 | 7.40 | 6.66 | 7.28 | 7.02 |
| 25 | 5.98 | 8.45 | 6.34 | 7.18 | 6.99 |
| Mean | 7.58 | 7.76 | 8.16 | 11.03 | 8.63 |

Generally, as the complexity of an image becomes larger, the quantization step size is set to be smaller. It can be seen from Table 4 that as the quantization step size becomes smaller, a reduction in the bit rate becomes more effective according to a variable length coding method of the present invention. Accordingly, in a variable length coding method of the present invention, a bit rate reduction effect becomes larger as the complexity of an image increases.

A variable length coding method of the present invention can be applied to H.261, H.263, MPEG-1, MPEG-2 and MPEG-4, which use variable length coding, and to H.26L proposals which uses universal variable length coding (UVLC).

Variable length coding and decoding methods according to the present invention can be made into programs which can be executed in a computer. The programs may be stored in a magnetic recording medium such as a floppy disc or a hard disc or an optical recording medium such as CD-ROM or DVD, or may be transmitted through a carrier wave medium such as Internet. Moreover, program codes and code segments constructing the programs can be easily inferred by computer programmers in the art.

As described above, a variable length coding method according to the present invention dynamically varies the mapping relationship between symbols and bit patterns based on the occurrence statistics of the symbols, thereby reducing the amount of bits generated when coding images of the same picture quality.

What is claimed is:

1. A method of variable length coding input image symbols, comprising the steps of:
   (a) selecting predetermined macroblocks from among macroblocks previous to a macroblock which is to be coded in a current frame;
   (b) analyzing occurrence statistics of symbols with respect to the selected macroblocks;
   (c) resetting a mapping relationship based on the analyzed occurrence statistics of symbols; and
   (d) variable length coding a current macroblock based on the reset mapping relationship;
   wherein the step (a) comprises the step of selecting macroblocks that are in the 4-connected neighborhood of the macroblock which is to be coded, from among the previous macroblocks of the macroblock to be coded.

2. The method of claim 1,
   wherein the step (a) comprises the steps of:
   (a-1) selecting symbols that occur a predetermined number of times or more from among symbols that are generated; and
   (a-2) analyzing the occurrence statistics of only the selected symbols, and the step (d) comprises the steps of:
   (d-1) variable length coding the selected symbols in the current macroblock based on the reset mapping relationship; and
   (d-2) variable length coding the unselected symbols in the current macroblock based on a default mapping relationship.

3. A method of variable length coding input image symbols, comprising the steps of:
   (a) selecting predetermined macroblocks from among macroblocks previous to a macroblock which is to be coded in a current frame;
   (b) analyzing occurrence statistics of symbols with respect to the selected macroblocks;
   (c) resetting a mapping relationship based on the analyzed occurrence statistics of symbols; and
   (d) variable length coding a current macroblock based on the reset mapping relationship;
   wherein the step (a) comprises the step of selecting macroblocks that are in the 8-connected neighborhood of the macroblock to be coded, from among the previous macroblocks of the macroblock which is to be coded.

4. An apparatus for variable length coding input image symbols, comprising:
   macroblock selecting means for selecting predetermined macroblocks from among macroblocks previous to a macroblock which is to be coded in a current frame;
   statistical analyzing means for analyzing the occurrence statistics of symbols with respect to the selected macroblocks;
   symbol mapping means for resetting a mapping relationship based on the analyzed occurrence statistics of symbols: and
   variable length coding means for variable length coding the macroblock which is to be coded based on the reset mapping relationship;
   wherein the macroblock selecting means comprises selecting means selected from the group consisting of first selecting means for selecting macroblocks that are in the 4-connected neighborhood of the macroblock which is to be coded, from among the macroblocks previous to the macroblock which is to be coded; second selecting means for selecting macroblocks that are in the 8-connected neighborhood of the macroblock which is to be coded, from among the macroblocks previous to the macroblock which is to be coded; and third selecting means for selecting macroblocks that are generated after resynchronization, from among the macroblocks previous to the macroblock which is to be coded.

5. The apparatus of claim 4, wherein the macroblock selecting means selects symbols that occur a predetermined number of times or more from among symbols that are generated, the statistical analyzing means analyzes the occurrence statistics of only the selected symbols, and the variable length coding means variable length codes the selected symbols in the macroblock which is to be coded based on the reset mapping relationship and variable length codes symbols, other than the selected symbols, in the macroblock which is to be coded based on a default mapping relationship.

* * * * *